United States Patent
Feng et al.

(10) Patent No.: US 8,711,521 B2
(45) Date of Patent: Apr. 29, 2014

(54) SUSPENSION WITH FLEXURE HAVING LAMINATED STRUCTURE AND BONDING PADS ON OPPOSING SURFACES THEREOF, AND HEAD GIMBAL ASSEMBLY AND DISK DRIVE UNIT WITH THE SAME

(75) Inventors: Xian wen Feng, DongGuan (CN); Fu quan Pang, DongGuan (CN); Hai ming Zhou, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 136 days.

(21) Appl. No.: 13/249,757

(22) Filed: Sep. 30, 2011

(65) Prior Publication Data
US 2013/0033785 A1    Feb. 7, 2013

(30) Foreign Application Priority Data
Aug. 4, 2011  (CN) .......................... 2011 1 0222019

(51) Int. Cl.
*G11B 21/16* (2006.01)
*G11B 5/48* (2006.01)

(52) U.S. Cl.
USPC ................. 360/241.3; 360/241.1; 360/245.8; 360/234.5

(58) Field of Classification Search
USPC ............. 360/244.1, 244.3, 245.8, 245.9, 246, 360/234.5
See application file for complete search history.

(56) References Cited

U.S. PATENT DOCUMENTS

| | | | |
|---|---|---|---|
| 5,754,368 A * | 5/1998 | Shiraishi et al. | 360/245.9 |
| 2010/0110590 A1* | 5/2010 | Ohsawa et al. | 360/234.5 |
| 2010/0226045 A1* | 9/2010 | Yamada et al. | 360/245 |
| 2011/0228425 A1* | 9/2011 | Liu et al. | 360/244.2 |
| 2012/0134056 A1* | 5/2012 | Yamada | 360/245.9 |

* cited by examiner

*Primary Examiner* — Craig A. Renner
(74) *Attorney, Agent, or Firm* — Nixon & Vanderhye, P.C.

(57) ABSTRACT

A suspension for a head gimbal assembly includes a flexure having a laminated structure including a substrate layer, an insulating layer formed on the substrate layer, and a conducting layer formed on the insulating layer. And first bonding pads are formed on the conducting layer at a first surface of the flexure, so as to electrically connect with a slider via solder balls, and second bonding pads are formed on the substrate layer at a second surface of the flexure opposite to the first surface, so as to electrically connect with extra components formed at the second surface via solder balls. The suspension can connect slider and other extra components at two opposite surfaces of the flexure with a simplified and compacted structure and a reduced cost.

15 Claims, 10 Drawing Sheets

SUSPENSION WITH FLEXURE HAVING LAMINATED STRUCTURE AND BONDING PADS ON OPPOSING SURFACES THEREOF, AND HEAD GIMBAL ASSEMBLY AND DISK DRIVE UNIT WITH THE SAME

This application claims the benefit of Chinese Patent Application No. 201110222019.7, filed on Aug. 4, 2011, the entire content of which is hereby incorporated by reference in this application.

FIELD OF THE INVENTION

The present invention relates to information recording disk drive devices and, more particularly, to a suspension, head gimbal assembly (HGA) and disk drive unit including the same.

BACKGROUND OF THE INVENTION

Hard disk drives are common information storage devices. FIG. 1a provides an illustration of a typical disk drive unit 100 essentially consisting of a series of rotatable disks 101 mounted on a spindle motor 102, and a Head Stack Assembly (HSA) 130 which is rotatable about an actuator arm axis 111 for accessing data tracks on disks during seeking. The HSA 130 includes at least one drive arm 104 and HGA 150. Typically, a spindling voice-coil motor (VCM) is provided for controlling the motion of the drive arm 104.

Referring to FIG. 1b, the HGA 150 includes a slider 103 having a reading/writing transducer (not shown) imbedded therein, a suspension 190 to load or suspend the slider 103 thereon. When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101. The suspension 190 includes a load beam 106, a base plate 108, a hinge 107 and a flexure 105, all of which are assembled together.

The load beam 106 is connected to the base plate 108 by the hinge 107. A locating hole 112 is formed on the load beam 106 for aligning the load beam 106 with the flexure 105. And the load beam 106 is welded with the flexure for increasing the strength of the entire structure. The base plate 108 is used to enhance structure stiffness of the whole HGA 100.

The flexure 105 is made of flexible material and runs from the hinge 107 to the load beam 106. As shown in FIG. 1c and FIG. 1d, the flexure 105 has a first surface 105a adapted for supporting the slider 103, and a second surface 105b adapted for supporting the extra components 19, 18 with special functions. Concretely, the flexure 105 is a laminated structure including a stainless steel layer 121, two polyimide layers 122, 123 sandwiching the stainless steel layer 121, two copper layers 124, 125 attaching on the polyimide layers 122, 123 respectively, and two cover layers 126, 127 covering on the two copper layers 124, 125 respectively. Namely, the stack layers are symmetrical to the stainless steel layer 121. Basing on this laminated structure, the slider 103 and the extra component 19, 18 can be bonded on the copper layers 124, 125 via solder balls 17, 15 respectively, which are called double sides bonding. Specially, as the stack layers attached on the stainless steel layer 121 on the second surface 105b, the extra component 19, 18 formed thereon can achieve the extra demand of the disk drive unit manufacturers.

However, on the other hand, as the flexure 105 having the laminated structure with seven layers 121-127 are thick and complicated, which increases the manufacturing cost. Thus, this suspension with such a flexure 105 is undesirable to the manufacturer.

Accordingly, it is desired to provide an improved suspension, HGA and disk drive unit to overcome the above-mentioned drawbacks.

SUMMARY OF THE INVENTION

One objective of the present invention is to provide a suspension having a flexure that can connect a slider and other extra components at two opposite surfaces of the flexure with a simplified and compacted structure and a reduced cost.

Another objective of the present invention is to provide a HGA having a flexure that can connect slider and other extra components at two opposite surfaces of the flexure with a simplified and compacted structure and a reduced cost.

Still another objective of the present invention is to provide a disk drive unit, which can connect slider and other applied components at two opposite surfaces of the flexure with a simplified and compacted structure and a reduced cost.

To achieve above objectives, a suspension of the present invention includes a flexure having a laminated structure including a substrate layer, an insulating layer formed on the substrate layer, and a conducting layer formed on the insulating layer. And first bonding pads are formed on the conducting layer at a first surface of the flexure, so as to electrically connect with a slider of an HGA via solder balls, and second bonding pads are formed on the substrate layer at a second surface of the flexure opposite to the first surface, so as to electrically connect with extra components formed at the second surface via solder balls.

As an embodiment of the present invention, both of the first and second bonding pads comprise at least one coating between a gold coating and a nickel coating.

Preferably, each first bonding pad comprises a nickel coating formed on the conducting layer, and a gold coating formed on the nickel coating.

Preferably, each second bonding pad comprises a nickel coating formed on the substrate layer, and a gold coating formed on the nickel coating.

Preferably, the suspension further includes a cover layer formed on the conducting layer.

Preferably, the substrate layer is made of stainless steel.
Preferably, the conducting layer is made of copper.
Preferably, the insulating layer is made of polyimide.

An HGA of the present invention includes a slider and a suspension for supporting the slider. The suspension includes a flexure having a laminated structure including a substrate layer, an insulating layer formed on the substrate layer, and a conducting layer formed on the insulating layer. And first bonding pads are formed on the conducting layer at a first surface of the flexure, so as to electrically connect with the slider via solder balls, and second bonding pads are formed on the substrate layer at a second surface of the flexure opposite to the first surface, so as to electrically connect with extra components formed at the second surface via solder balls.

As an embodiment of the present invention, both of the first and second bonding pads comprise at least one coating between a gold coating and a nickel coating.

Preferably, each first bonding pad comprises a nickel coating formed on the conducting layer, and a gold coating formed on the nickel coating.

Preferably, each second bonding pad comprises a nickel coating formed on the substrate layer, and a gold coating formed on the nickel coating.

Preferably, the suspension further includes a cover layer formed on the conducting layer.

Preferably, the substrate layer is made of stainless steel.

Preferably, the conducting layer is made of copper.

Preferably, the insulating layer is made of polyimide.

A disk drive unit of the present invention includes an HGA including a slider and a suspension for supporting the slider, a drive arm connected to the HGA, a disk, and a spindle motor to spin the disk. The suspension includes a flexure having a laminated structure including a substrate layer, an insulating layer formed on the substrate layer, and a conducting layer formed on the insulating layer. And first bonding pads are formed on the conducting layer at a first surface of the flexure, so as to electrically connect with the slider via solder balls, and second bonding pads are formed on the substrate layer at a second surface of the flexure opposite to the first surface, so as to electrically connect with extra components formed at the second surface via solder balls.

In comparison with the prior art, as the second bonding pad is formed on the substrate layer directly, thus the extra component can be bonded on the second surface of the flexure via some solder balls to increase other special functions to improve the performance of the slider. Moreover, the laminated structure of the flexure is simplified without adding the extra insulating layer and conducting layer, thus the manufacturing cost of the flexure is reduced.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1A:
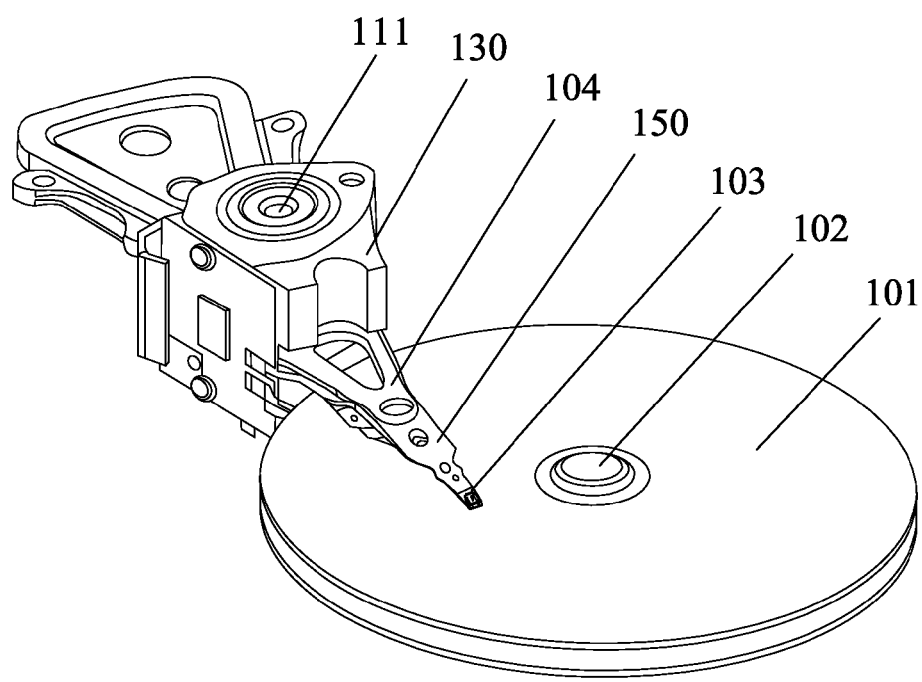
FIG. 1a is a partial perspective view of a conventional disk drive unit.
Figure 1B:
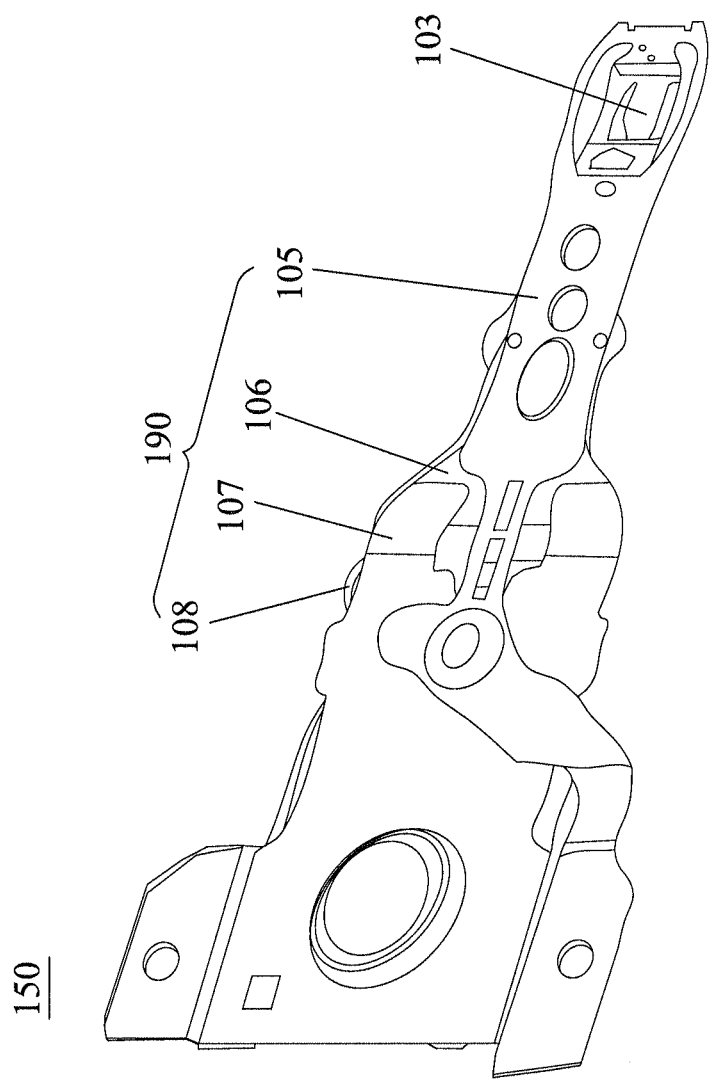
FIG. 1b is a partial top plan view of a conventional HGA.
Figure 1C:
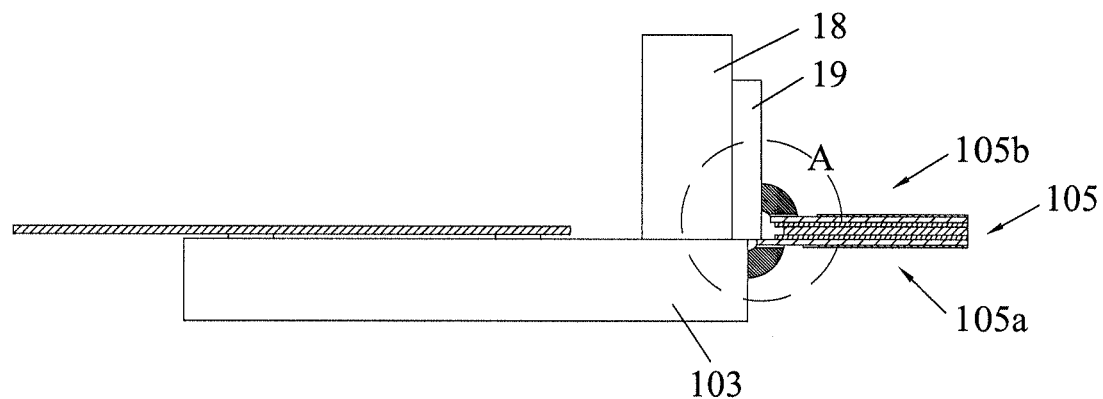
FIG. 1c is a cross section view of a partial flexure with the slider formed thereon.
Figure 1D:
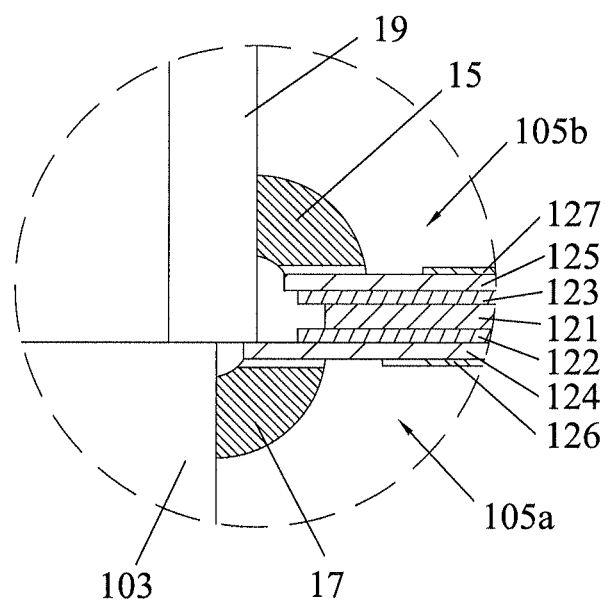
FIG. 1d is an enlarged view of portion A shown in FIG. 1c, which shows a laminated structure of the flexure.

Various preferred embodiments of the invention will now be described with reference to the figures, wherein like reference numerals designate similar parts throughout the various views. As indicated above, the invention is directed to a suspension for a HGA of a disk drive unit, which includes a flexure with a simple structure for bonding a slider or other extra components on the first and second surface of the flexure, so as to support more special functions on one hand, and to make the structure of the flexure more simple and reduce the manufacturing cost on the other hand.

Figure 2:
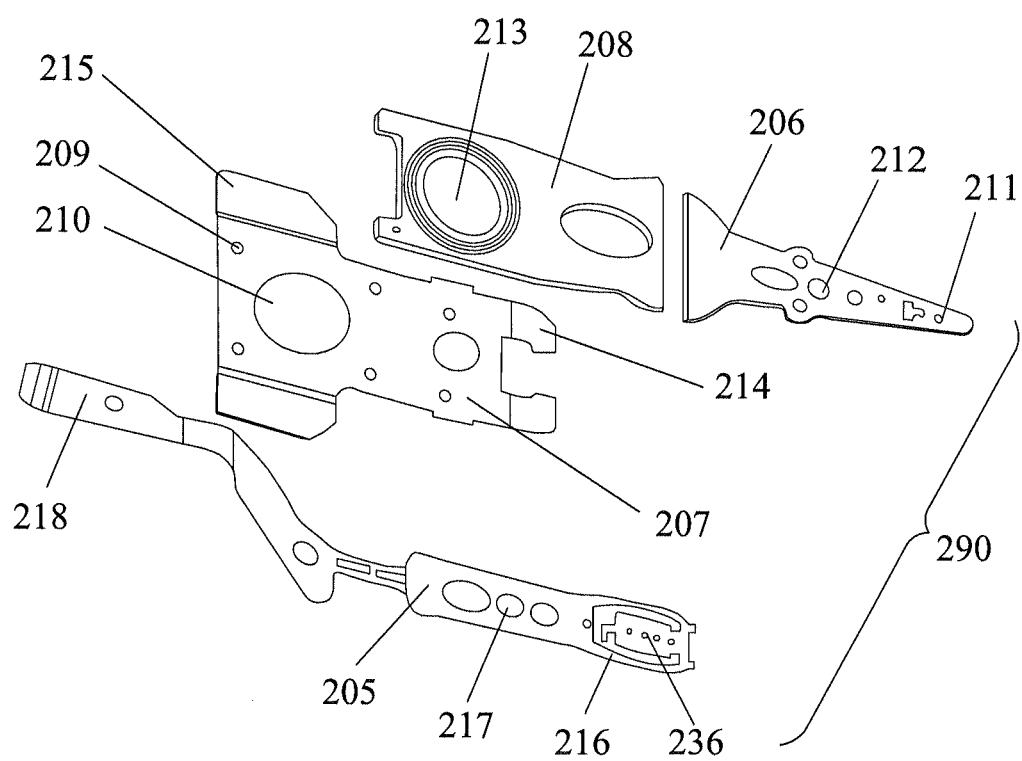
FIG. 2 is an exploded view of a suspension according to an embodiment of the present invention.

FIG. 2 shows an embodiment of a suspension of the present invention. As illustrated in FIG. 2, a suspension 290 including a load beam 206, a base plate 208, a hinge 207 and a flexure 205, all of which are assembled with each other.

Referring to FIG. 2, the load beam 206 is used to transfer load forces to the flexure 205 and a slider mounted on the flexure 205. Any suitable rigid material such as stainless steel may be used to form the load beam 206 such that the load beam 206 has sufficient stiffness to transfer the load forces to the flexure 205. The load beam 206 is connected to the base plate 208 by the hinge 207. A locating hole 212 is formed on the load beam 206 for aligning itself with the flexure 205. A dimple 211 is formed on the load beam 206 to support the flexure 205 at a position corresponding to a center of the slider. By this engagement of the dimple 211 with the flexure 205, the load forces can be transferred to the slider uniformly.

The base plate 208 is used to enhance structure stiffness of the whole suspension 290 and may be made of rigid material such as stainless steel. A mounting hole 213 is formed on one end of the base plate 208 for mounting the whole suspension 290 to a motor arm of a disk drive unit.

The hinge 207 has a mounting hole 210 formed on its one end corresponding to the mounting hole 213 of the base plate 208, and the hinge 207 is partially mounted to the base plate 208 with the mounting holes 210, 213 aligned with each other. The hinge 207 and the base plate 208 may be mounted together by laser welding at a plurality of pinpoints 209 distributed on the hinge 207. In addition, two hinge steps 215 may be integrally formed at two sides of the hinge 207 at one end adjacent the mounting hole 210 for strengthening stiffness of the hinge 207. Two hinge struts 214 are extended from the other end of the hinge 207 to partially mount the hinge 207 to the load beam 206.

The flexure 205 is made of flexible material and runs from the hinge 207 to the load beam 206. The flexure 205 has a tail portion 218 adjacent the hinge 207 and a top portion 216 adjacent the load beam 206. A locating hole 217 is formed on the top portion 216 of the flexure 205 and is aligned with the locating hole 212 of the load beam 206. The perfect alignment between the locating holes 217 and 212 can assure a high assembly precision between the flexure 205 and the load beam 206. A suspension tongue 236 is provided at the top portion 216 of the flexure 205 to support the slider 203 (referring to FIG. 4) thereon.

Figure 3:
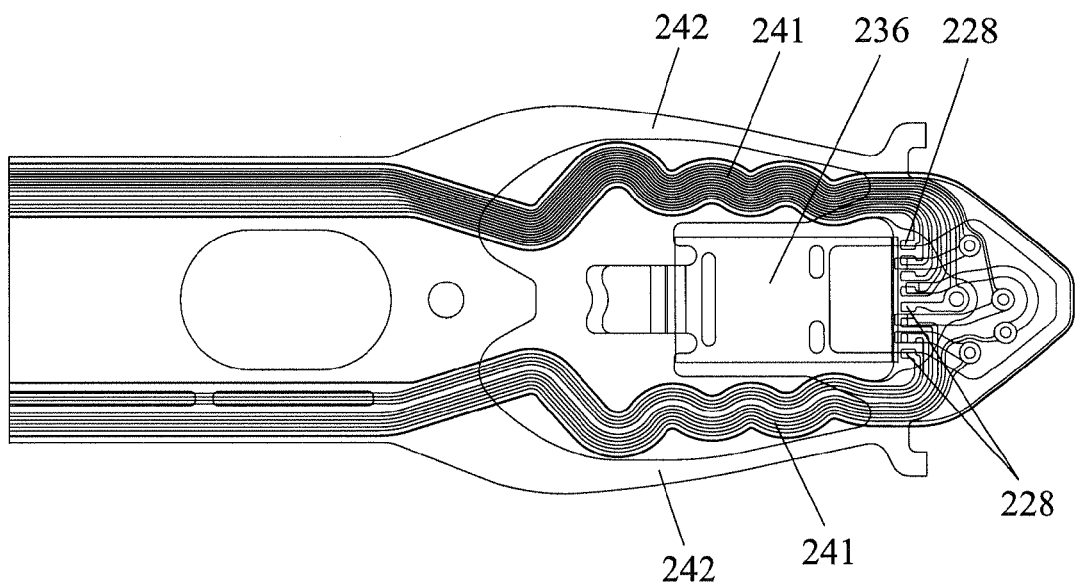
FIG. 3 is a detailed partial view of the flexure of the suspension shown in FIG. 2.

Referring to FIG. 3, a plurality of first bonding pads 228 is formed on the suspension tongue 236 for electrical connection to the slider 203. A plurality of electrical traces 241 runs along the flexure 205 on both sides, from the top portion 216 of the flexure 205 toward the tail portion 218, to connect with a flex cable of the VCM (not shown). The flexure 205 further includes a pair of straight struts 242 respectively connected to the suspension tongue 236 and extending along a longitudinal direction of the flexure 205.

Figure 4:
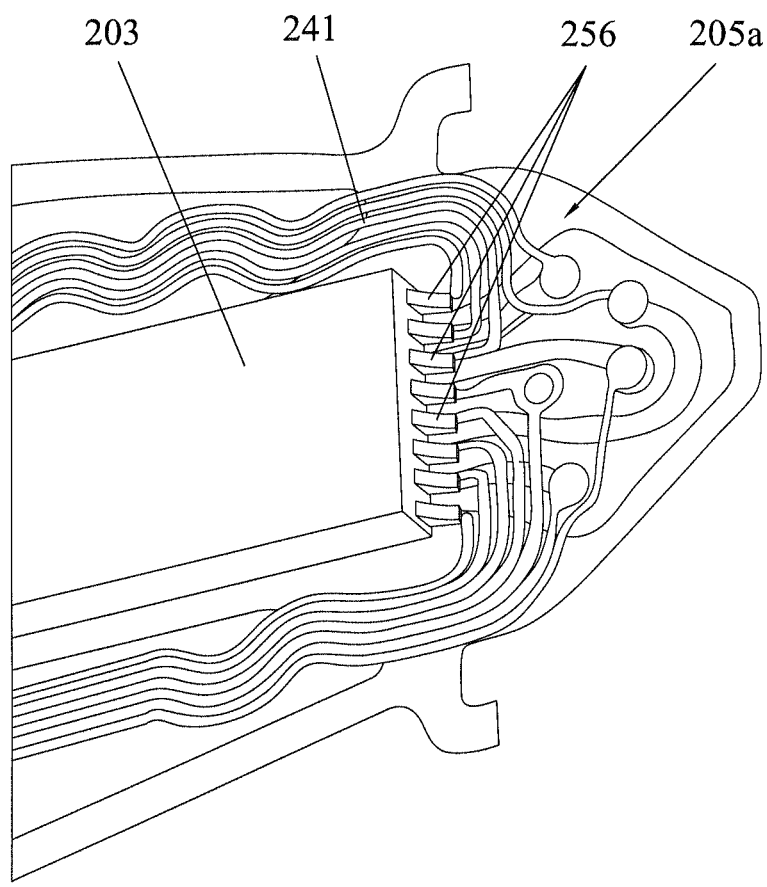
FIG. 4 is a perspective view of a partial HGA with a slider formed on the flexure at the first surface thereof.
Figure 5:
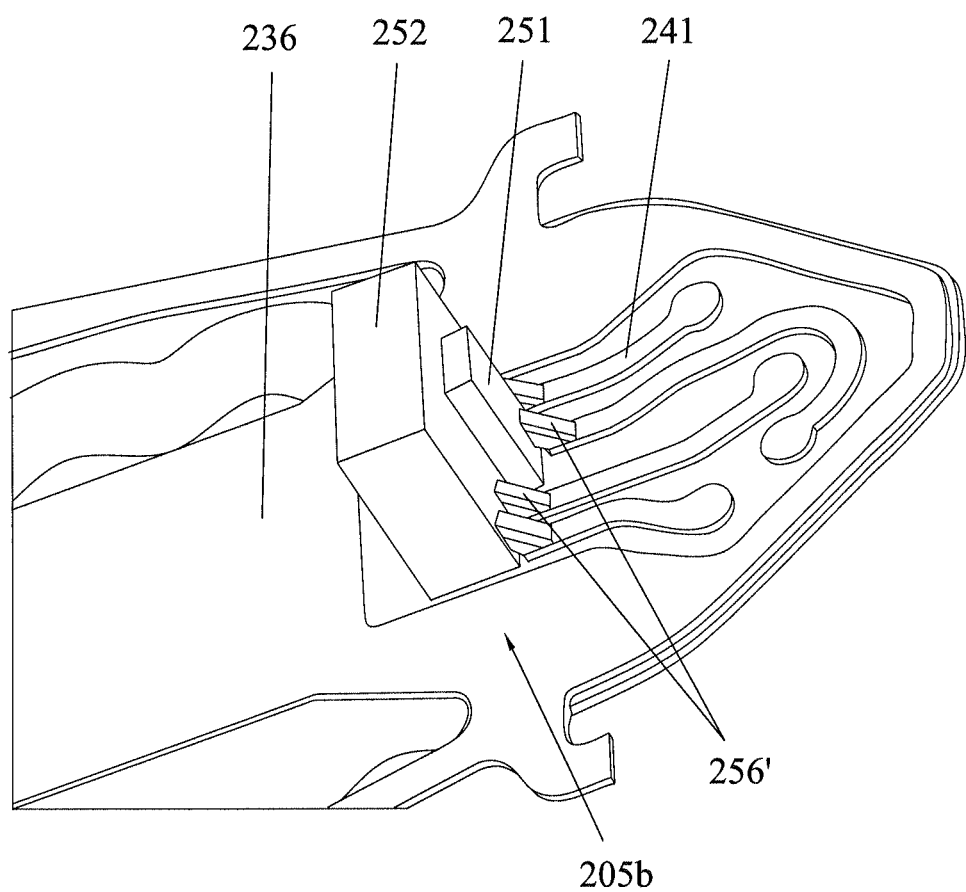
FIG. 5 is a back side view of the partial HGA shown in FIG. 4, which shows the second surface of the flexure.
Figure 6A:
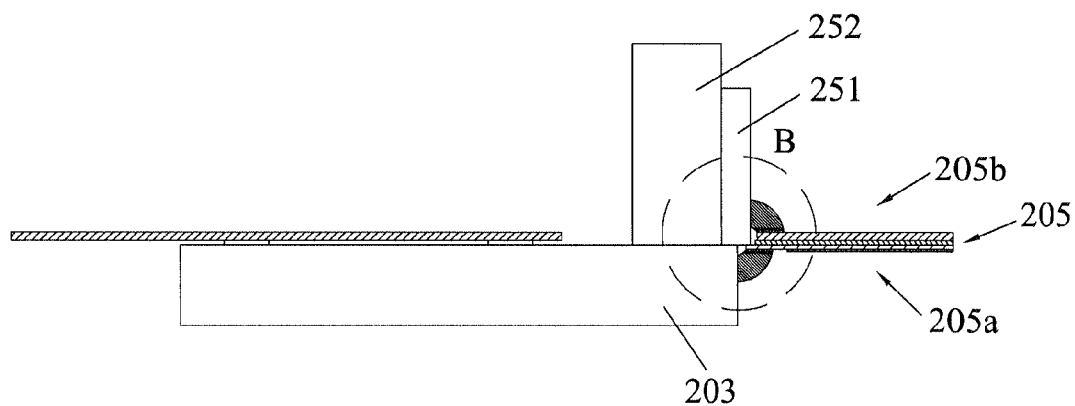
FIG. 6a is a cross section view of a partial HGA shown in FIG. 5.
Figure 6B:
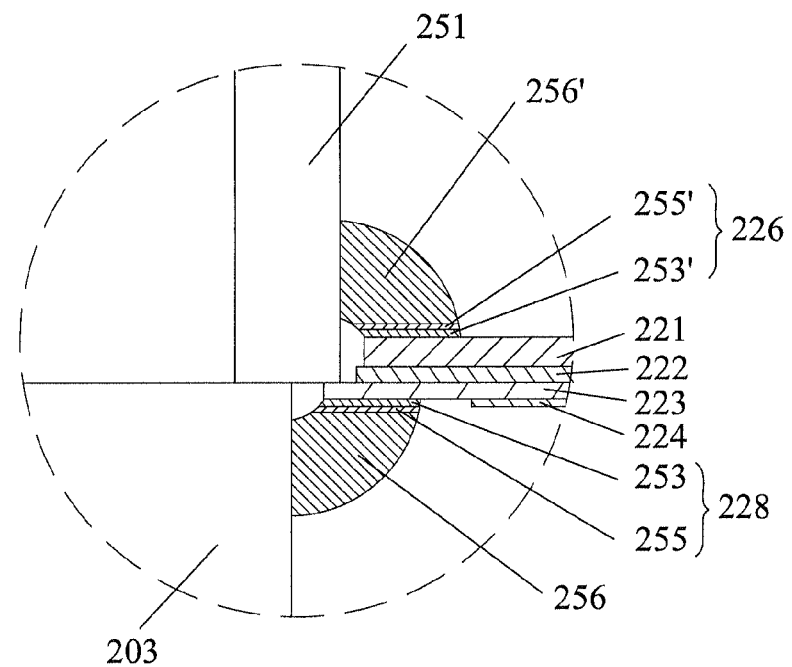
FIG. 6b is an enlarged view of portion B shown in FIG. 6a, which shows a laminated structure of the flexure.

FIG. 4 shows the first surface 205a of the top portion 216 of the flexure 205, on which the slider 203 is attached. FIG. 5 shows the second surface 205b of the top portion 216 of the flexure 205 opposite the first surface 205a. FIGS. 6a-6b are a cross section view of the flexure 205 with the slider 203 formed thereon and an enlarged view of portion B. Referring to FIGS. 3-6b, as described above, a series of first bonding pads 228, such as eight, are formed on the first surface 205a of the flexure 205, and multiple second bonding pads 226 formed on a second surface 205b of the flexure 205. The first bonding pads 228 are electrically connected with the electrical traces 241 and adapted to electrically connect to the slider 203 of the HGA via several solder balls 256, in turn, the slider 203 is electrically connected with the control servo.

Figure 7A:
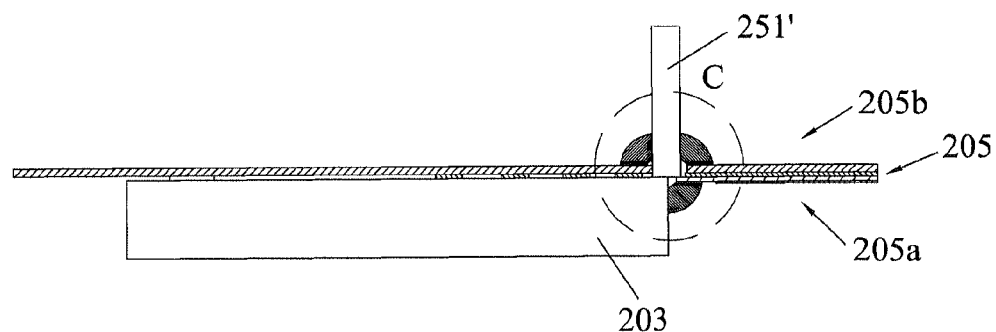
FIG. 7a is a cross section view of a partial HGA according to another embodiment.

For adding some special functions for the slider 203, some extra components 251, 252 with special functions will be formed on the second surface 205b of the flexure 205 that is opposite to the first surface 205a, as shown in FIGS. 5 and 7a. The second bonding pads 226 electrically connect to the electrical traces 241. And the second bonding pads 226 serving as the connectors connect with the components 251, 252 to achieve some functions which may improve the slider's writing/reading performance.

Referring to FIGS. 6a-6b, the flexure 205 is a laminated structure which includes a substrate layer 221, an insulating layer 222 formed on the substrate layer 221, a conducting layer 223 formed on the insulating layer 222, and a cover layer 224 formed on the partial conducting layer 223, seen from the first surface 205a to the second surface 205b. Preferably, the substrate layer 221 is made of stainless steel, the conducting layer 223 is made of copper, and the insulating layer 222 is made of polyimide.

As described above, the first bonding pads 228 are formed on the first surface 205a of the flexure 205. Concretely, the first bonding pad 228 is formed on the conducting layer 223 for electrically connecting with the slider 203. Preferably, the first bonding pad 228 includes a nickel coating 253 formed on the conducting layer 223, and a gold coating 255 formed on the nickel coating 253. Thus, the slider 203 is bonded on the flexure 205 via several solder balls 256 between the first bonding pads 228 and the bonding pads (not shown) on the slider 203.

The second bonding pads 226 are formed on the second surface 205b of the flexure 205, so as to connect with the extra components 251, 252 with special functions at a trailing edge of the extra components 251, 252. Each second bonding pad 226 is directly plated on the substrate layer 221 of the laminated structure. Concretely, the second bonding pad 226 includes a nickel coating 253' formed on the substrate layer 221, and a gold coating 255' formed on the nickel coating 253'. As the nickel coating 253' and the gold coating 255' are plated on the substrate layer 221 in turn, thereby forming a second bonding pad 226, so that the extra components 251, 252 can be bonded on the back side of the slider 203 via some solder balls 256' to increase other special function to improve the performance of the slider. Moreover, the laminated structure of the flexure 205 is simplified without adding the extra insulating layer and conducting layer, thus the manufacturing cost of the flexure is reduced.

Figure 7B:
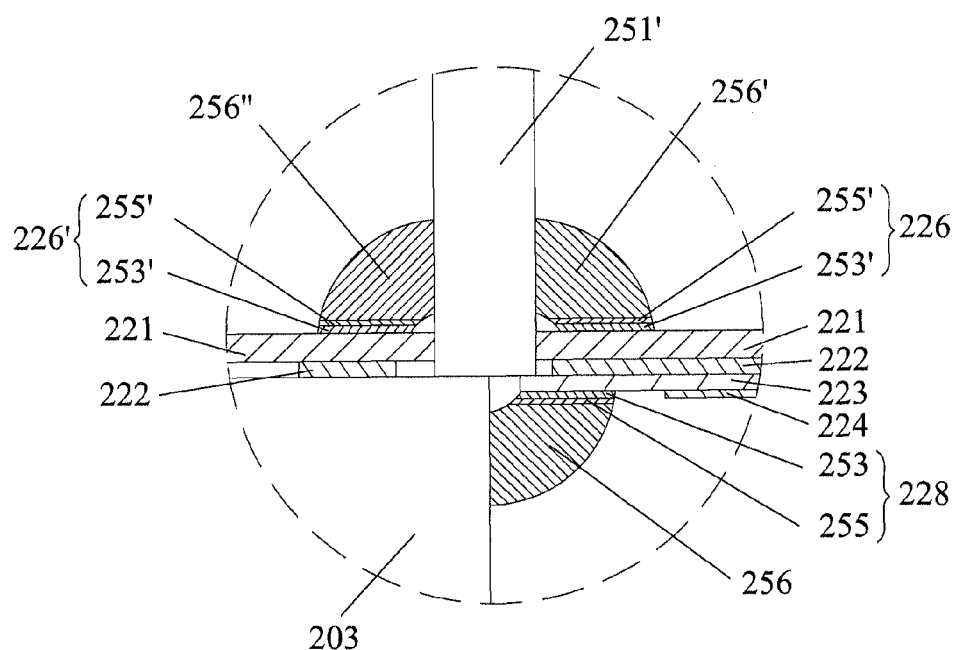
FIG. 7b is an enlarged view of portion C shown in FIG. 7a, which shows a laminated structure of the flexure.

FIGS. 7a-7b shows that the flexure 205 according to another embodiment. The laminated structure of the flexure 205 is similar to the above embodiment, the difference is that, two groups second bonding pads 226, 226' are formed on the trailing edge and the leading edge of the extra component 251' respectively, and two groups solder balls 256', 256" are formed between the second bonding pads 226 and the trailing edge of the extra component 251', and between the second bonding pads 256" and the leading edge of the extra component 251'. The structure of the second bonding pads 226, 226' is the same, which is formed on the substrate layer 221 as well.

It should be noticed that, the second bonding pads of the present invention can be directly formed on any position of the substrate layer 221 at the second surface 205b of the flexure 205, thereby achieving the electrical connection of the extra component 251' and the electrical traces 241, and simplifying the laminated structure of the flexure 205 and, in turn, reducing the manufacturing cost.

The present invention also provides an HGA 200 according to an embodiment of the invention comprises a suspension 290 (referring to FIG. 2) and a slider 203 (referring to FIGS. 4-5) carried on the suspension 290. The suspension 290 comprises a load beam 206, a base plate 208, a hinge 207 and the flexure 205, all of which are assembled with each other. And then the slider 203 is carried on the flexure 205.

Figure 8:
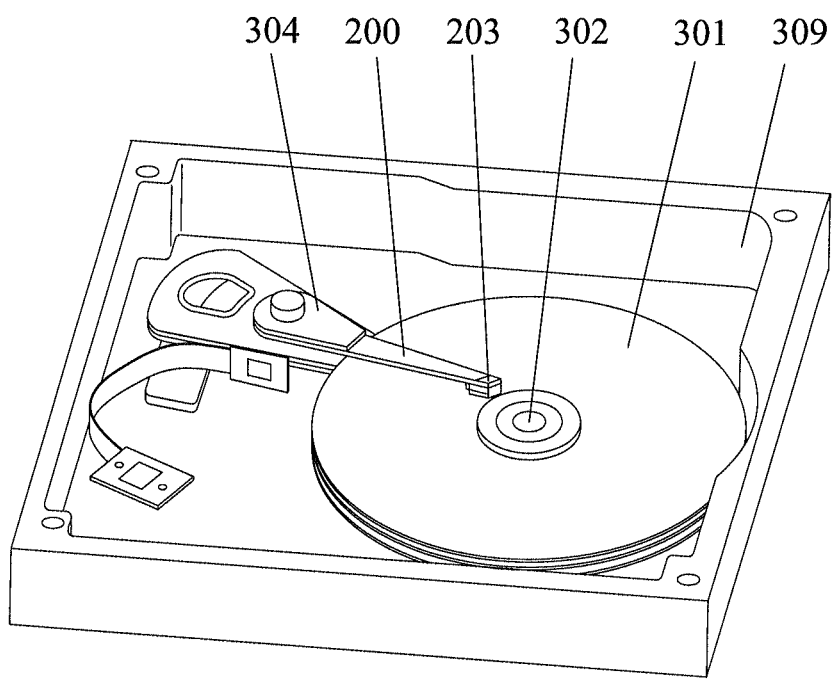
FIG. 8 is a perspective view of a disk drive unit according to an embodiment of the present invention.

FIG. 8 is a disk drive unit according to an embodiment of the invention. The disk drive unit 300 comprises a HGA 200, a drive arm 304 connected to the HGA 200, a series of rotatable disks 301, and a spindle motor 302 to spin the disk 301, all of which are mounted in a housing 309. Because the structure and/or assembly process of disk drive unit of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A suspension for a head gimbal assembly, comprising:
a flexure having a laminated structure comprising a substrate layer made of stainless steel, an insulating layer formed on the substrate layer, and a conducting layer formed on the insulating layer, wherein first bonding pads are formed on the conducting layer at a first surface of the flexure, so as to electrically connect with a slider of the head gimbal assembly via solder balls, and second bonding pads are formed directly on and in physical contact with the substrate layer at a second surface of the flexure opposite to the first surface, so as to electrically connect with extra components formed at the second surface via solder balls.

2. The suspension as claimed in claim 1, wherein both of the first and second bonding pads comprise at least one coating selected between a gold coating and a nickel coating.

3. The suspension as claimed in claim 2, wherein each first bonding pad comprises a nickel coating formed on the conducting layer, and a gold coating formed on the nickel coating.

4. The suspension as claimed in claim 2, wherein each second bonding pad comprises a nickel coating formed on the substrate layer, and a gold coating formed on the nickel coating.

5. The suspension as claimed in claim 1, further comprising a cover layer formed on the conducting layer.

6. The suspension as claimed in claim 1, wherein the conducting layer is made of copper.

7. The suspension as claimed in claim 1, wherein the insulating layer is made of polyimide.

8. A head gimbal assembly, comprising:
a slider; and
a suspension for supporting the slider, comprising:
a flexure having a laminated structure comprising a substrate layer made of stainless steel, an insulating layer formed on the substrate layer, and a conducting layer formed on the insulating layer, wherein first bonding pads are formed on the conducting layer at a first surface of the flexure, so as to electrically connect with the slider via solder balls, and second bonding pads are formed directly on and in physical contact with the substrate layer at a second surface of the flexure opposite to the first surface, so as to electrically connect with extra components formed at the second surface via solder balls.

9. The head gimbal assembly as claimed in claim 8, wherein both of the first and second bonding pads comprise at least one coating selected between a gold coating and a nickel coating.

10. The head gimbal assembly as claimed in claim 9, wherein each of the first bonding pads comprises a nickel coating formed on the conducting layer, and a gold coating formed on the nickel coating.

11. The head gimbal assembly as claimed in claim 8, wherein each of the second bonding pads comprises a nickel coating formed on the substrate layer, and a gold coating formed on the nickel coating.

12. The head gimbal assembly as claimed in claim 8, further comprising a cover layer formed on the conducting layer.

13. The head gimbal assembly as claimed in claim 8, wherein the conducting layer is made of copper.

14. The head gimbal assembly as claimed in claim 8, wherein the insulating layer is made of polyimide.

15. A disk drive unit, comprising:
a head gimbal assembly including a slider and a suspension for supporting the slider;
a drive arm connected to the head gimbal assembly;
a disk; and
a spindle motor to spin the disk;
wherein the suspension comprising a flexure having a laminated structure which comprises a substrate layer made of stainless steel, an insulating layer formed on the substrate layer, and a conducting layer formed on the insulating layer, wherein first bonding pads are formed on the conducting layer at a first surface of the flexure, so as to electrically connect with the slider via solder balls, and second bonding pads are formed directly on and in physical contact with the substrate layer at a second surface of the flexure opposite to the first surface, so as to electrically connect with extra components formed at the second surface via solder balls.

* * * * *